(12) United States Patent
Wang et al.

(10) Patent No.: US 11,665,659 B2
(45) Date of Patent: May 30, 2023

(54) METHOD FOR MANAGING TIME ALIGNMENT FOR UPLINK TRANSMISSION BETWEEN A UE AND A NETWORK NODE IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 27 days.

(21) Appl. No.: 16/763,262

(22) PCT Filed: Nov. 2, 2018

(86) PCT No.: PCT/SE2018/051121
§ 371 (c)(1),
(2) Date: May 12, 2020

(87) PCT Pub. No.: WO2019/098907
PCT Pub. Date: May 23, 2019

(65) Prior Publication Data
US 2020/0337010 A1    Oct. 22, 2020

(30) Foreign Application Priority Data
Nov. 14, 2017 (WO) ................ PCT/CN2017/110884

(51) Int. Cl.
*H04W 56/00* (2009.01)
*H04L 41/0803* (2022.01)
*H04W 72/0453* (2023.01)

(52) U.S. Cl.
CPC ..... *H04W 56/0045* (2013.01); *H04L 41/0803* (2013.01); *H04W 72/0453* (2013.01)

(58) Field of Classification Search
CPC ......... H04W 56/0045; H04W 72/0453; H04W 56/0015; H04W 56/0005; H04L 41/0803
See application file for complete search history.

(56) References Cited

U.S. PATENT DOCUMENTS

| | | | |
|---|---|---|---|
| 2011/0170535 A1* | 7/2011 | Wang | H04W 56/0045 370/350 |
| 2011/0310845 A1* | 12/2011 | Jung | H04W 36/385 370/331 |

(Continued)

FOREIGN PATENT DOCUMENTS

| | | |
|---|---|---|
| WO | 2011085200 A1 | 7/2011 |
| WO | 2017167724 A2 | 10/2017 |

OTHER PUBLICATIONS

62556503,Specification (Year: 2017).*
(Continued)

*Primary Examiner* — Yu-Wen Chang
(74) *Attorney, Agent, or Firm* — Christopher & Weisberg, P.A.

(57) ABSTRACT

A method performed by a User Equipment (UE) for managing Time Alignment (TA) for Uplink (UL) transmissions between the UE and a network node in a wireless communications network. The network node serves a cell comprising at least a first UL carrier (111) and a second UL carrier (112). The UE is configured (502) with a first TA configuration for the first UL carrier (111) in the cell. The UE is further configured (503) with a second TA configuration for the second UL carrier in the cell. The UE then activates (504) at least one of the first and second TA configuration for the UE.

14 Claims, 12 Drawing Sheets

(56) References Cited

U.S. PATENT DOCUMENTS

| | | | |
|---|---|---|---|
| 2012/0120821 A1 | 5/2012 | Kazmi et al. | |
| 2013/0114576 A1 | 5/2013 | Kwon et al. | |
| 2013/0188580 A1 | 7/2013 | Dinan | |
| 2015/0189610 A1 | 7/2015 | Siomina et al. | |
| 2015/0304891 A1 | 10/2015 | Dinan | |
| 2015/0312869 A1* | 10/2015 | Lee | H04W 56/004 370/329 |
| 2015/0334763 A1* | 11/2015 | Park | H04W 76/15 370/336 |
| 2015/0373660 A1* | 12/2015 | Gunnarsson | H04W 76/27 370/350 |
| 2016/0044617 A1* | 2/2016 | Vajapeyam | H04W 76/15 370/336 |
| 2016/0255621 A1* | 9/2016 | Wu | H04W 56/0045 370/329 |
| 2017/0006599 A1* | 1/2017 | Dinan | H04L 27/26 |
| 2018/0084546 A1* | 3/2018 | Guo | H04W 56/0015 |
| 2019/0053182 A1* | 2/2019 | Choi | H04W 56/0045 |
| 2019/0053183 A1* | 2/2019 | Park | H04L 5/0082 |
| 2019/0141697 A1* | 5/2019 | Islam | H04W 72/0453 |
| 2019/0253992 A1* | 8/2019 | Kwon | H04W 56/0005 |
| 2020/0045659 A1* | 2/2020 | Mariner | H04W 56/0045 |
| 2020/0100201 A1* | 3/2020 | Farmanbar | H04W 56/0045 |
| 2020/0235871 A1* | 7/2020 | Kim | H04W 72/0453 |
| 2020/0260398 A1* | 8/2020 | Jiang | H04W 72/1257 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, 1-108.

3GPP, "3rd Generation Partnership Project; Technical Specification Group Radio Access Network; Evolved Universal Terrestrial Radio Access (E-UTRA); Physical channels and modulation (Release 14)", 3GPP TS 36.211 V14.4.0, Sep. 2017, 1-197.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, 1-753.

3GPP, "3rd Generation Partnership Project; Technical Specification Group Radio Access Network; Evolved Universal Terrestrial Radio Access (E-UTRA); Requirements for support of radio resource management (Release 15)", 3GPP TS 36.133 V15.0.0, Sep. 2017, 1-69.

* cited by examiner

METHOD FOR MANAGING TIME ALIGNMENT FOR UPLINK TRANSMISSION BETWEEN A UE AND A NETWORK NODE IN A WIRELESS COMMUNICATION NETWORK

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

SUMMARY

An object of embodiments herein is to improve the performance of a wireless communications network with multiple carriers.

According to a first aspect of embodiments herein, the object is achieved by a method performed by a User Equipment, UE, for managing Time Alignment, TA, for Uplink, UL, Transmissions between the UE and a network node in a wireless communications network. The network node serves a cell comprising at least a first UL carrier and a second UL carrier. The UE is configured with a first TA configuration for the first UL carrier in the cell. The UE is further configured with a second TA configuration for the second UL carrier in the cell. The UE then activates at least one of the first and second TA configuration for the UE.

According to a second aspect of embodiments herein, the object is achieved by a method performed by a network node for managing Time Alignment, TA, for Uplink, UL, Transmissions, between a User Equipment, UE, and the network node in a wireless communications network. The network node serves a cell comprising at least a first UL carrier and a second UL carrier. The network node obtains a first TA configuration data for the first UL carrier in the cell. The network node further obtains a second TA configuration data for the second UL carrier in the cell. The network node sends the first TA configuration data and the second TA configuration data to the UE.

The network node then activates at least one of a first TA configuration based on the first TA configuration data and a second TA configuration based on the second TA configuration data for the UE.

According to a third aspect of embodiments herein, the object is achieved by a User Equipment, UE, for managing Time Alignment, TA, for Uplink, UL, transmissions between the UE and a network node in a wireless communications network. The network node serves a cell adapted to comprise at least a first UL carrier and a second UL carrier. The UE is configured to: Configure the UE with a first TA configuration for the first UL carrier in the cell, configure the UE with a second TA configuration for the second UL carrier in the cell, and activate at least one of the first and second TA configuration for the UE.

According to a fourth aspect of embodiments herein, the object is achieved by network node for managing Time Alignment, TA, for Uplink, UL, transmissions between a User Equipment, UE, and the network node in a wireless communications network. The network node serves a cell adapted to comprise at least a first UL carrier and a second UL carrier. The network node is configured to: Obtain a first TA configuration data for the first UL carrier in the cell, and a second TA configuration data for the second UL carrier in the cell, send the first TA configuration data and the second TA configuration data to the UE, and activate at least one of the first TA configuration based on the first TA configuration data and second TA configuration based on the second TA configuration data for the U E.

Since the UE is configured with a first TA configuration for the first UL carrier in the cell and a second TA configuration for the second UL carrier in the same cell, i.e. at least two TA configurations in the same cell, timing management ambiguity when one cell has more than one UL carriers is avoided. In this way, the performance of a wireless communications network with multiple carriers is improved.

BRIEF DESCRIPTION OF THE DRAWINGS

Examples of embodiments herein are described in more detail with reference to attached drawings in which.

DETAILED DESCRIPTION

As a part of developing embodiments herein a problem of the bitmap solution will first be identified and discussed.

Supplementary Uplink (SUL) Carriers

Introduction of SUL carriers is mainly motivated to improve the uplink coverage for NR which is deployed at relative high frequency bands. The SUL carriers are deployed at the low frequency region, for example, at the LTE frequency band. In this way, the uplink coverage of NR bands can be comparable with that in LTE.

Figure 1:
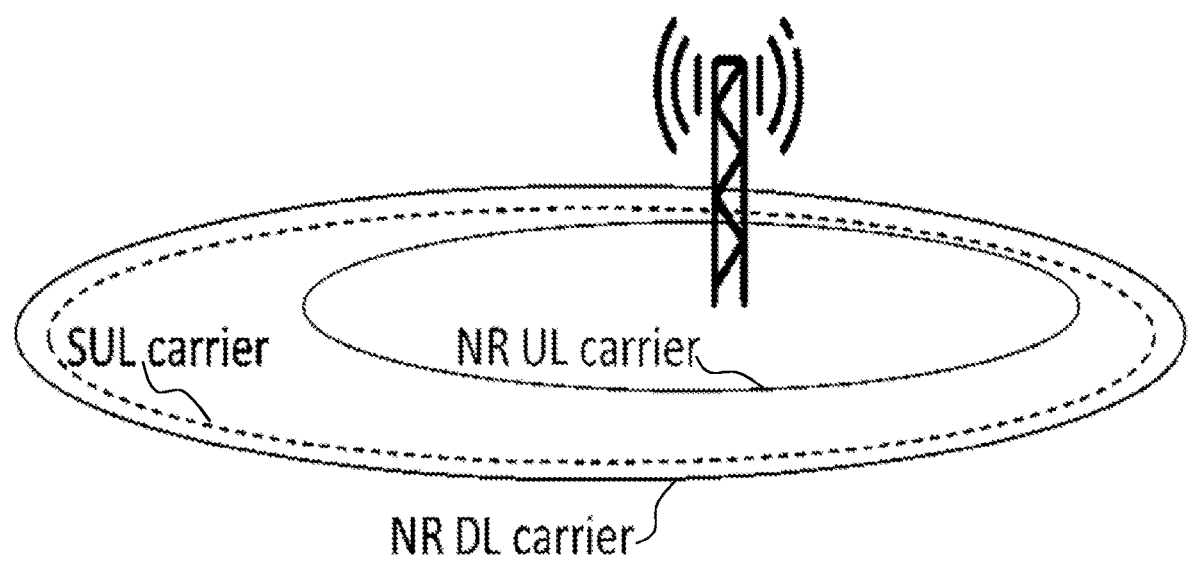
FIG. 1 is a schematic block diagram illustrating prior art.

The SUL carrier is not paired with any downlink frequency from band combination perspective. The SUL carrier and NR UL carrier together are associated with a downlink NR carrier. From technology potential point of view, there are two options to model the SUL carrier. In the first option, the SUL carrier is modelled as a separate uplink carrier, different from the NR UL carrier. Both carriers are aggregated in the same way as the uplink carrier aggregation. So, the SUL carrier forms a separate Secondary Cell (Scell). In the second option, a SUL carrier and NR UL/DL carriers are in the same cell. In this case, the SUL carrier is more like a separate UL configuration. The UE may maintain two UL configurations, while, the UE may keep only one UL configuration active. FIG. 1 shows the coverage difference between an NR UL carrier and a SUL carrier provided by a network node, which coverage difference is an NR frequency combination of paired carrier and SUL for UL only.

Time Alignment Design in LTE

The timing adjustment indication specified in 3GPP TS 36.331-e20 indicates the initial timing advance, $N_{TA}$ used for a Timing Advanced Group (TAG). The timing advance command for a TAG indicates the change of the uplink timing relative to the current uplink timing for the TAG as multiples of 16 $T_S$, where $T_S$ is the symbol duration. The start timing of a random access preamble is specified in 3GPP TS 36.211. In case of random access response, an 11-bit timing advance command, $T_A$, for a TAG indicates $N_{TA}$ values by index values of $T_A$=0, 1, 2, . . . , 256 if the UE is configured with a Secondary Cell Group (SCG), and $T_A$=0, 1, 2, . . . , 1282 otherwise, where an amount of the time alignment for the TAG is given by $N_{TA}=T_A \times 16$. $N_{TA}$ is defined in 3GPP TS 36.211-e20.

In other cases, a 6-bit timing advance command, see 3GPP TS 36.321-e20, $T_A$, for a TAG indicates adjustment of the current $N_{TA}$ value, $N_{TA,old}$, to the new $N_{TA}$ value, $N_{TA,new}$, by index values of $T_A$=0, 1, 2, . . . , 63, where $N_{TA,new}$= $N_{TA,old}+(T_A-31)\times 16$. Here, adjustment of $N_{TA}$ value by a positive or a negative amount indicates advancing or delaying the uplink transmission timing for the TAG by a given amount respectively, for LTE, the granularity is around 0.5208 us.

For a timing advance command received on subframe n, the corresponding adjustment of the uplink transmission timing shall apply from the beginning of subframe n+6. For serving cells in the same TAG, when the UE's uplink Physical Uplink Control Channel (PUCCH) and/or Physical Uplink Shared Channel (PUSCH) and/or Sounding Reference Signal (SRS) transmissions in subframe n and subframe n+1 are overlapped due to the timing adjustment, the UE shall complete transmission of subframe n and not transmit the overlapped part of subframe n+1.

If the received downlink timing changes and is not compensated or is only partly compensated by the uplink timing adjustment without timing advance command as specified in 3GPP TS 36.133, the UE changes $N_{TA}$ accordingly.

Timing Advance Command MAC Control Element in LTE

In 3GPP TS 36.321-e20, the Timing Advance Command Medium Access Control (MAC) control element is identified by MAC Protocol Data Unit (PDU) sub header with Logical Channel Identity (LCID) as specified in table 6.2.1-1 in 3GPP TS 36.321-e20. LCID is a component of a MAC header. An LCID identifies the logical channel that is associated with the data or a MAC control element.

Figure 2:
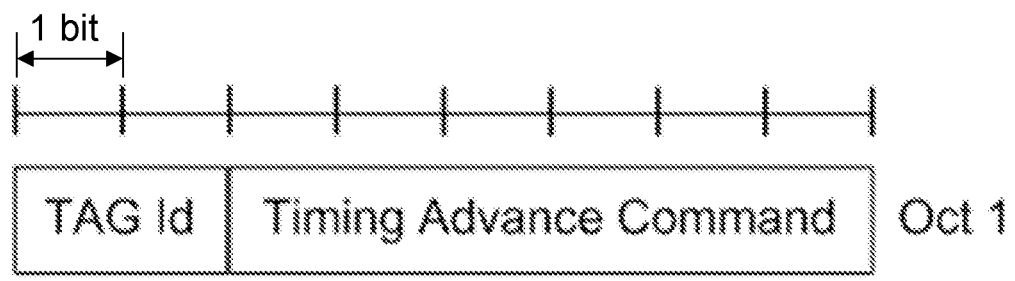
FIG. 2 is a schematic block diagram illustrating prior art.
Figure 6:
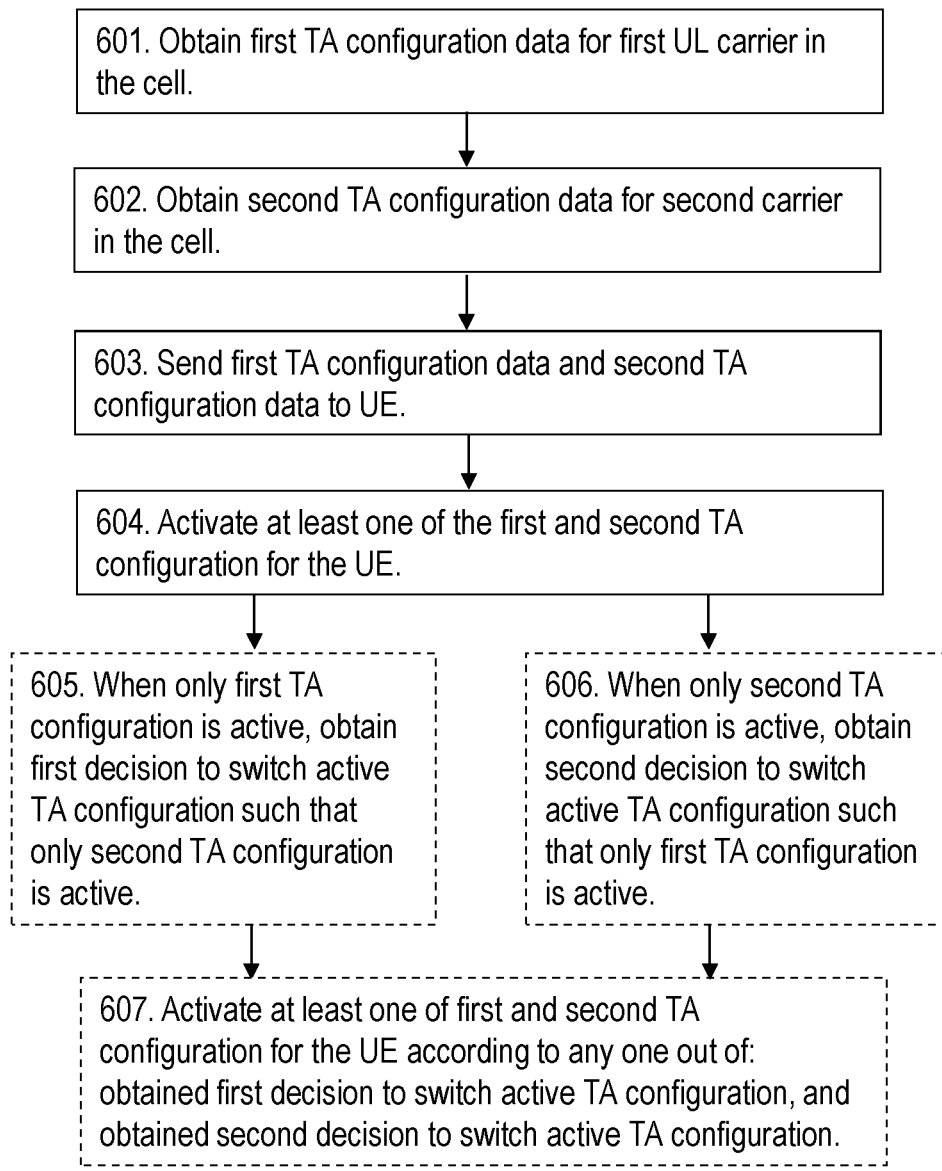
FIG. 6 is a flowchart depicting embodiments of a method in a network node.

The Timing Advance Command MAC control element has a fixed size and consists of a single octet comprising 8 bits defined as follows illustrated in FIG. 2 which shows FIG. 6.1.3.5-1 of 3GPP TS 36.321-e20 depicting a Timing Advance Command MAC control element:

TAG Identity (TAG Id): This field indicates the TAG Identity of the addressed TAG. The TAG containing the Special Cell (SpCell) has the TAG Identity 0. The length of the field is 2 bits;

Timing Advance Command: This field indicates the index value $T_A$ (0, 1, 2 . . . 63) used to control the amount of timing adjustment that MAC entity has to apply, see subclause 4.2.3. The length of the field is 6 bits.

A random access procedure is initiated with the obtained system information for several purposes including mainly.
1) Initial radio link establishment which moves the UE from the Radio Resource Control (RRC) IDLE status to the RRC connected status.
2) Re-establishment of the radio link if the radio link failure is triggered.
3) Uplink synchronization between the UE and the network: a timing advance (TA) value is estimated by the network from a Physical Random Access Channel (PRACH) transmission by a UE and assigned to the UE, included in the random access response message, for the UE to adjust the uplink timing.

As mentioned above, the initial UL synchronization between the UE and the network is obtained via Random Access Channel (RACH) access procedure. After that when the UE is in active mode, an eNB continuously measures timing of uplink signal, via PUSCH and/or PUCCH and/or SRS, transmitted from each UE and adjusts the UL transmission timing if necessary. The TA adjustment is sent by the network such as the eNB using MAC Control Element.

The TA updates are mainly due to facts including e.g.
1) The movement of a UE, leading to the changes of the propagation delay depending primarily on the distance of the UE from the eNB.
2) The changes of the propagation paths, for example, some paths disappear, and some new ones arise, causing changes to the propagation delay.
3) Oscillator drift in the UE, where the accumulation of small frequency errors over time may result in timing errors.
4) Doppler shift arising from the UE movement, resulting in an additional frequency offset of the uplink signals received at eNB.

Time Advance Management in LTE

In LTE, the TAG is configured per cell. The TAG containing an Secondary Cell (SCell) is named as Secondary TAG (STAG) In the Information Element (IE), RadioResourceConfigDedicatedSCell-r10 specified in 3GPP TS 36.321-e20, there is a field MAC-MainConfigSCell-r11, which configures the STAG Identity (ID) for an SCell as can be seen in the below snapshot from the 3GPP TS 36.321-e20.

specific TAG and/or TAT may not always be feasible due to one or multiple of the following reasons:
- The SUL carrier and the NR DL carrier may be non-collocated.
- The SUL carrier and the NR UL carrier may use different numerologies: For instance, the SUL carrier uses Sub Carrier Spacing (SCS) 15 KHz while NR UL carrier uses SCS 60 KHz. This means that the SUL carrier and the NR UL carrier may require different timing accuracy due to Cyclic Prefix (CP) length difference, comprising frequency and granularity for timing adjustments.
- The SUL carrier and the NR UL carrier may have different activity status, single timing management configuration as LTE is not efficient to ensure good timing management for high activity carrier and overhead reduction from timing management. Activity status means the status of the control and/or data transmission activity.

Figure 3:
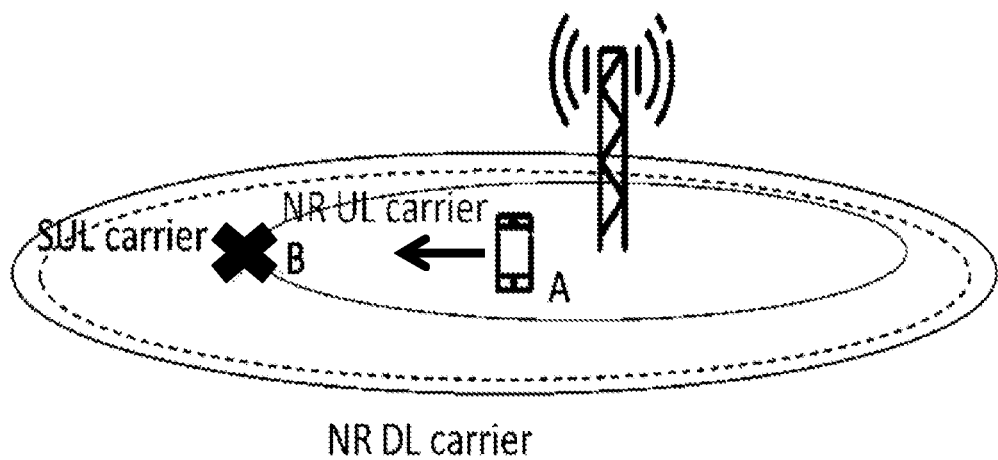
FIG. 3 is a schematic block diagram illustrating prior art.

FIG. 3 shows the coverage mismatch between NR UL carrier and SUL carrier for an NR cell provided by a network node, and an example on the problem.

The UL synchronization of the UE depend on the TAT and the granularity e.g. the format and/or the coding, of the TA. It is therefore important to further improve the management mechanism for timing advance for an NR cell with SUL carriers, to avoid timing management ambiguity when one NR cell has more than one UL carriers.

```
RadioResourceConfigDedicatedSCell-r10 ::=      SEQUENCE {
    -- UE specific configuration extensions applicable for an SCell
    physicalConfigDedicatedSCell-r10         PhysicalConfigDedicatedSCell-r10
    OPTIONAL,    -- Need ON ...,
    [[  mac-MainConfigSCell-r11              MAC-MainConfigSCell-r11
        OPTIONAL    -- Cond SCellAdd
    ]],
    [[  naics-Info-r12                       NAICS-AssistanceInfo-r12
    OPTIONAL    -- Need ON
    ]],
    [[  neighCellsCRS-InfoSCell-r13          NeighCellsCRS-Info-r13
    OPTIONAL    -- Need ON
    ]]
}
MAC-MainConfigSCell-r11 ::=                  SEQUENCE {
    stag-Id-r11                                  STAG-Id-r11
    OPTIONAL,    -- Need OP
    ...
}
}
```

The TAG containing a Primary Cell (PCell) is named as primary Timing Advance Group (pTAG). For the pTAG, the UE uses the PCell as timing reference.

The cells in one TAG shares the same TA command. In addition, there is a Time Alignment Timer (TAT) which is configured to determine a time alignment failure. In this way, the TAT governs how often the network node such as the eNB needs to send a TA command to maintain UL time synchronization of the UE for the TAG. When a TA command is received when the TAT timer is running, the TAT timer is restarted. If the TAT expires, time alignment failure is triggered and the UE should initiate random access procedure to get the timing information from the serving cell.

In LTE, the TAG and the corresponding TAT also referred to as timeAlignmentTimer are configured per cell. It is applicable for LTE because there is usually only one UL carrier for one cell. However, for an NR cell which is configured with both SUL carrier and NR UL carrier, cell An object of embodiments herein is to improve the performance of a wireless communications network with multiple carriers.

Embodiments herein provide methods in a wireless communications network comprising multiple carriers with improved performance such as in some embodiments, Multiple Timing Advance Configurations for NR System with SUL Carrier.

According to some embodiments herein, a TA management scheme is provided where both UL carriers belong to the same TAG but with different TA configurations. In one embodiment, only one configuration is active, e.g. depending on which UL is active, and in some other embodiments both configurations are active simultaneously, e.g. meaning that two timers may be running and with separate TA commands for the different ULs. In another embodiment, the ULs are mapped to different TAGs. Also in this case, two configurations may be active simultaneously. To be mapped to different TAGs when used herein means a carrier is configured in a timing advance group with other carriers or cells so that they share with the same uplink TA and same downlink timing reference cell.

Figure 4:
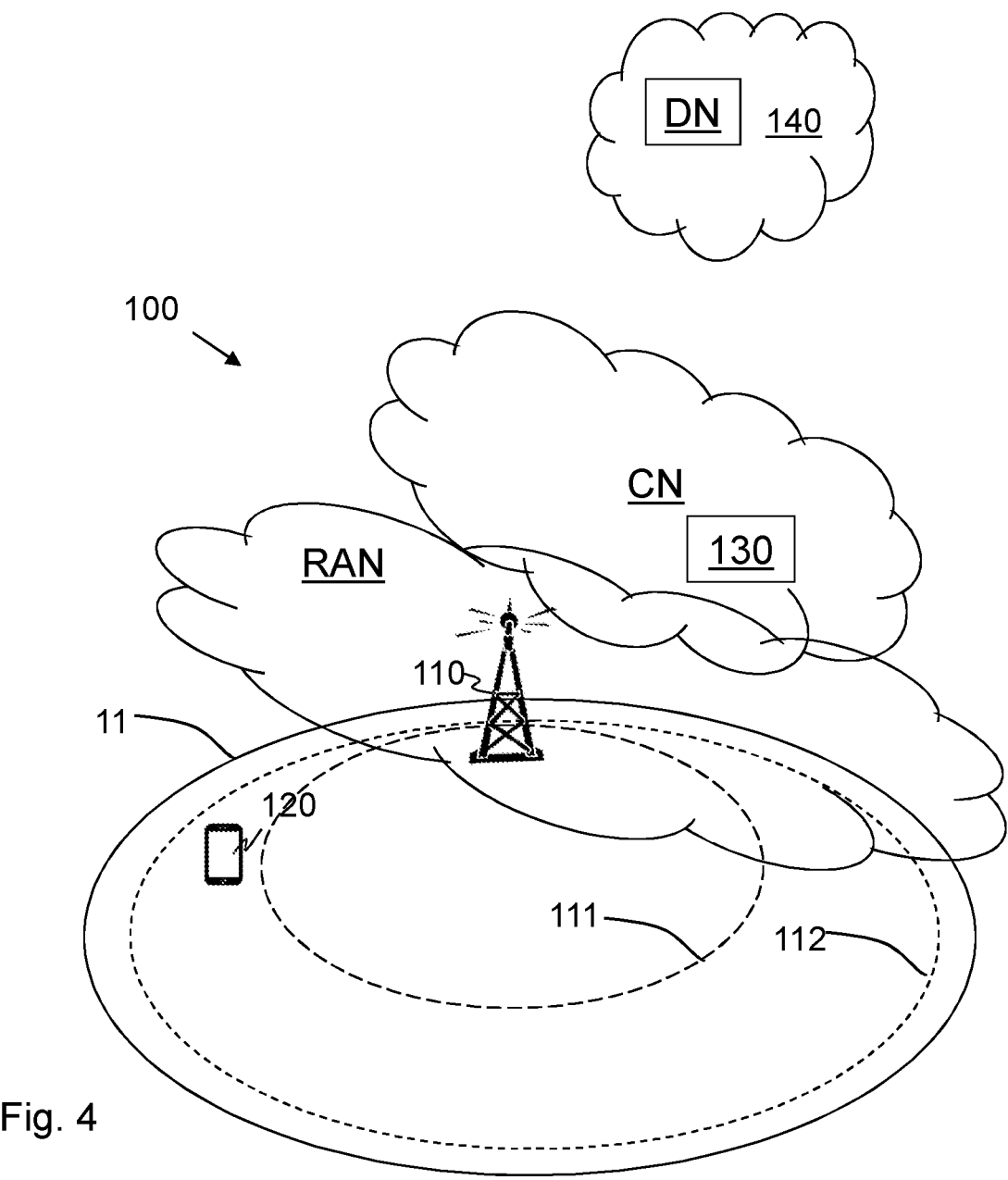
FIG. 4 is a schematic block diagram illustrating embodiments of a wireless communications network.

Embodiments herein relate to wireless communication networks in general. FIG. 4 is a schematic overview depicting a wireless communications network 100 in which embodiments herein may be implemented. The wireless communications network 100 comprises one or more RANs and one or more CNs. The wireless communications network 100 may use NR but may further use a number of other different technologies, such as, 5G, NB-IoT, CAT-M, Wi-Fi, eMTC, Long Term Evolution (LTE), LTE-Advanced Wideband Code Division Multiple Access (VVCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a network node 110, providing radio coverage over a geographical area, a cell 11. The cell 11 may also be referred to as a service area, beam or a group of beams multiple TRPs, or multiple BWPs. The cell 11 is configured with multiple UL carries such as multiple beams, multiple TRPs, or multiple BWPs. E.g. an NR cell configured with both a SUL carrier and an NR UL carrier. The cell 11 comprises at least a first UL carrier 111 and a second UL carrier 112, wherein the first UL carrier 111 may be an NR UL carrier and the second UL carrier 112 may be a SUL carrier. The SUL carrier may be associated with the NR UL carrier, i.e., the NR UL carrier may be the carrier that the SUL carrier provides extended UL coverage towards.

The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point or an Access Point Station (AP STA), an access controller, or any other network unit capable of communicating with a UE within the cell 11 served by the network node 110 depending e.g. on the radio access technology and terminology used. The network node 110 may be referred to as a serving radio network node and communicates with a UE 120 with Downlink (DL) transmissions to the UE 120 and Uplink (UL) transmissions from the UE 120.

Wireless devices such as e.g. a UE 120 operate in the wireless communications network 100. The UE120 may e.g. be an NR device a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Further network nodes operate in the wireless communications network 100, such as a network node 130. The network node 130 may be an MME which is a control node for an LTE access network and an NR network, a Serving Gateway (SGW), and a Packet Data Network Gateway (PGVV).

Methods according to embodiments herein may be performed by the network node 110. As an alternative, a Distributed Node DN and functionality, e.g. comprised in a cloud 140 as shown in FIG. 4 may be used for performing or partly performing the methods.

Figure 5:
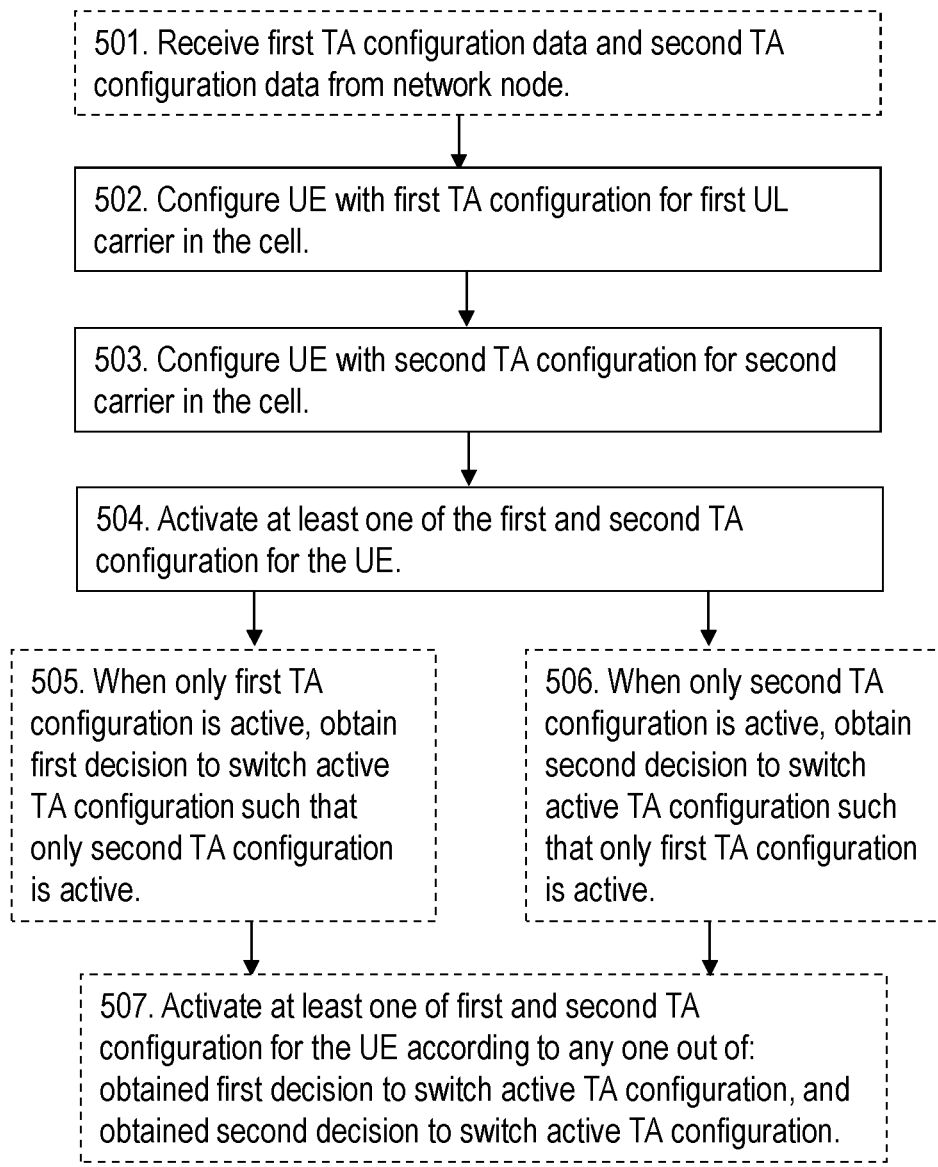
FIG. 5 is a flowchart depicting embodiments of a method in a UE.

Example embodiments of a method performed by the UE 120 e.g. for managing TA for UL transmissions between the UE 120 and the network node 110 in the wireless communications network 100, such as e.g. an NR communications system, will now be described with reference to a flowchart depicted in FIG. 5. Some related first, second, third, fourth and fifth embodiments will be described more in detail later on in this document.

The method may comprise one or more of the following actions which actions may be taken in any suitable order. The network node 110 serves the cell 11 comprising multiple carriers whereof at least a first UL carrier 111 and a second UL carrier 112. In some embodiments such as the fourth embodiments, the cell 11 comprises more than two UL carriers. In some embodiments the first carrier may be any NR UL carrier and the second UL carrier 112 may be a SUL carrier.

The method comprises the following actions, which actions may be taken in any suitable order. Actions that are optional are presented in dashed boxes in FIG. 5.

Action 501

In some embodiments, the UE 120 receives first TA configuration data and second TA configuration data from the network node 110. This may e.g. be received via RRC signalling.

According to embodiments herein at least two UL carriers belongs to the same cell 11 but with different TA configurations.

Action 502

In this action, the UE 120 is configured with a first TA configuration for the first UL carrier 111 in the cell 11. As mentioned above the first UL carrier 111 may in some embodiments be an NR UL carrier.

In some embodiments, the UE 120 has received first TA configuration data from the network node 110. In these embodiments the configuring of the UE 120 with the first TA configuration is performed based on the first TA configuration data.

Action 503

The UE 120 is further configured with a second TA configuration for the second UL carrier in the cell 11. As mentioned above the second UL carrier 112 may in some embodiments be a SUL carrier.

In some embodiments, the UE 120 has received second TA configuration data from the network node 110. In these embodiments, the configuring of the UE 120 with the second TA configuration is performed based on the second TA configuration data.

If the network node 110 provides more than two UL carriers in the cell 11 such as in the fourth embodiments described below, the UE 120 may further be configured with a TA configuration for the respective other carriers in the cell 11.

Each of the first TA configuration and second TA configuration may be a configuration for any one or more out of: TAT, timing advance granularity, and a range of timing advance.

In some embodiments such as e.g. the first and second embodiments described below, the cell 11 is configured with a single TAG. In these embodiments, the at least first UL carrier 111 and second UL carrier 112 all belong to the same said single TAG but with different TA configurations including at least the first TA configuration and the second TA configuration.

In some other embodiments such as e.g. the third embodiments described below, the cell 11 is configured with at least two TAGs. In these embodiments, the at least first UL carrier 111 and second UL carrier 112 all belong different TAGs with different TA configurations including at least the first TA configuration and the second TA configuration.

Action 504

The UE 120 then activates at least one of the first and second TA configuration for the UE 120.

In some embodiments such as e.g. the first embodiments described below, only one TA configuration out of the first TA configuration and the second TA configuration is active at a time.

In some other embodiments such as e.g. the second embodiments and the third embodiments described below, at least both the first TA configuration and the second TA configuration are active simultaneously.

In some of the embodiments such as e.g. the second embodiments and the third embodiments described below, the first UL carrier 111 is configured with a first TAT and the second UL carrier 112 is configured with a second TAT, which first TAT and second TAT run simultaneously.

In some embodiments such as e.g. the first embodiments described below wherein only one TA configuration out of the first TA configuration and the second TA configuration is active at a time, the UE 120 is enabled to switch between TA configurations for the different UL carriers in the cell 11. I.e. the UE 120 may switch from the first UL carrier to the second UL carrier and consequently also switch from the first TA configuration for the first UL carrier in the cell 11 to the TA configuration for the second UL carrier in the cell 11. In these embodiments any of the action 505-507 may be performed.

Action 505

This action relates to the case when only the first TA configuration is active. The UE 120 may then obtain a first decision to switch active TA configuration such that only the second TA configuration is active. This first decision may e.g. be obtained by deciding it in the UE 120 or receiving it from the network such as the network node 110.

Action 506

This action relates to the case when only the second TA configuration is active. The UE 120 may then obtain a second decision to switch active TA configuration such that only the first TA configuration is active. This second decision may e.g. be obtained by deciding it in the UE 120 or receiving it from the network such as the network node 110.

Action 507

The UE 120 then activates at least one of the first and second TA configuration for the UE 120 according to any one out of: the obtained first decision to switch active TA configuration and the obtained second decision to switch active TA configuration.

Example embodiments of a method performed by the network node 110 e.g. for managing TA for UL Transmissions between the UE 120 and the network node 110 in a wireless communications network 100, such as e.g. an NR communications system, will now be described with reference to a flowchart depicted in FIG. 6. As mentioned above, the related first, second, third, fourth and fifth embodiments will be described more in detail later on. The method may comprise one or more of the following actions which actions may be taken in any suitable order. The network node 110 serves the cell 11 comprising at least a first UL carrier 111 and a second UL carrier 112. In some embodiments the cell 11 comprises more than two UL carriers. In some embodiments the first carrier may be any NR UL carrier and the second UL carrier 112 may be a SUL carrier.

The method comprises the following actions, which actions may be taken in any suitable order. Actions that are optional are presented in dashed boxes in FIG. 6.

Action 601

The network node 110 obtains a first TA configuration data for the first UL carrier 111 in the cell 11.

Action 602

The network node 110 obtains a second TA configuration data for the second UL carrier in the cell 11.

If the network node 110 provides more than two UL carriers in the cell 11 such as the fourth embodiments, the network node 110 may obtain TA configuration data for the respective other UL carriers in the cell 11.

Action 603

The network node 110 sends the first TA configuration data and the second TA configuration data to the UE 120. This may e.g. be performed via RRC signalling.

Action 604

The network node 110 activates at least one of a first TA configuration based on the first TA configuration data and a second TA configuration based on the second TA configuration data for the UE 120.

If the network node 110 provides more than two UL carriers in the cell 11, the network node 110 may further obtain configuration data comprising a TA configuration for the respective other carriers in the cell 11.

Each of the first TA configuration data and second TA configuration data may be configuration data for any one or more out of: Time Alignment Timer, TAT, timing advance granularity, and a range of timing advance.

In some embodiments such as e.g. the first and second embodiments described below, the cell 11 is configured with a single TAG. In these embodiments, the at least first UL carrier 111 and second UL carrier 112 all belong to the same said single TAG but with different TA configurations including at least the first TA configuration and the second TA configuration.

In some other embodiments such as e.g. the third embodiments described below, the cell 11 is configured with at least two TAGs. In these embodiments, the at least first UL carrier 111 and second UL carrier 112 all belong different TAGs with different TA configurations including at least the first TA configuration and the second TA configuration.

In some other embodiments such as e.g. the first embodiments described below, only one TA configuration out of the first TA configuration and the second TA configuration is active at a time.

In some other embodiments such as e.g. the second embodiments and the third embodiments described below, at least both the first TA configuration and the second TA configuration are active simultaneously.

In some of the embodiments such as e.g. the second embodiments and the third embodiments described below, the first UL carrier 111 is configured with a first TAT, and the second UL carrier 112 is configured with a second TAT, which first TAT and second TAT run simultaneously.

In some embodiments such as e.g. the first embodiments described below, the UE 120 may be capable of switching activation between the different TA configurations. In these embodiments any of the action 605-607 may be performed.

Action 605

This action relates to the case when only the first TA configuration is active. The network node 110 may then obtain a first decision to switch active TA configuration such that only the second TA configuration is active.

Action 606

This action relates to the case when only the second TA configuration is active. The network node 110 may then obtain a second decision to switch active TA configuration such that only the first TA configuration is active.

The decision to switch may be based on similar as in Action 605.

Action 607

The network node 110 may then activate at least one of the first and second TA configuration for the UE 120 according to any one out of: the obtained first decision to switch active TA configuration and the obtained second decision to switch active TA configuration.

Embodiments herein such as e.g. the first, second, third, fourth and fifth embodiments mentioned above will now be further described and exemplified. The text below is applicable to and may be combined with any suitable embodiment described above. In the embodiments below an NR UL carrier is used as an example of the first UL carrier 111 and a SUL carrier s used as an example of the second UL carrier 111, however, the examples below may be applied to any UL carriers belonging to the same cell.

In the examples below, the first carrier 111 is represented by the NR UL carrier and the second carrier 112 is represented by the SUL carrier.

First Embodiments

In the first embodiments, the SUL carrier and the associated NR UL carrier, e.g. the carrier that the SUL carrier provides extended UL coverage towards, belong to the same timing advance group. This means a TA command may be applied for both SUL carrier and NR UL carrier of the same cell.

The UE 120 is configured with multiple TA separate configurations for TAT such as timeAlignmentTimer and/or timing granularity. One TA configuration is applicable for the NR UL carrier and the other configuration is applicable for the SUL carrier. The mapping between UL carriers, the SUL carrier and NR UL carrier, and the respective TA granularities may be configured e.g. by sending the respective TA configuration data via RRC signaling. The UE 120 such that its UE MAC entity maintains only a single TAT referred to as timeAlignmentTimer, and switches the timer value and/or time granularity when the UE 120 switches between the SUL carrier and the NR UL carrier. There may be several options regarding how the UE 120 switches between the first and second TA configurations.

In one option, the switch between the first and second TA configurations may be triggered upon reception of signaling from the network such as the network node 110. The signaling options may comprise any one out of Downlink Control Information (DCI), MAC Control Element (MAC-CE) and RRC signaling. In this option the network such as the network node 110 may have decided to switch, the UE 120 is then informed via signaling.

In another option, the UE 120 such as its UE MAC entity may have several alternatives to determine which TA configuration to apply according to predefined rules such as e.g.:

Alternative 1: The UE 120 determines which TA configuration to activate depending on what PRACH configuration and/or resource that has been used to perform a RACH. The SUL carrier and NR UL carrier may be associated with different PRACH configurations and/or resources. The UE 120 such as its UE MAC entity may learn what UL carrier is currently being used depending on which PRACH configuration and/or resource that was used for the RACH access.

Alternative 2: The UE 120 determines which TA configuration to activate depending on what the carrier index is carried in the DCI, or if they are using different search spaces. The DCI may carry the index of SUL carrier or the NR UL carrier.

Alternative 3: The UE 120 determines which TA configuration to activate based on the range of PUSCH resources, i.e., in other words, the PUSCH resources for both carriers may be indexed in the same space. For example, Physical Resource Block (PRB) indices between 0 to N−1 where N is a integer >0, are assigned to SUL carrier, while PRB indices between N to M where M is integer >N, are assigned to the non SUL carrier.

Second Embodiments

In the second embodiments, the SUL carrier and the NR UL carrier, belong to the same timing advance group. The UE 120 maintains two active TA configurations, i.e., two TATs also referred to as timeAlignmentTimers are active at the same time, which may be associated with different settings of the timer values, and/or the different TA granularities. When there are two timers active at the same time, the TA MAC CE is updated to carry an indication on the carrier, such as either SUL carrier or NR UL carrier, which applies the TA command before the corresponding timer expires.

For example, the MAC CE format may be changed to include the indication on the UL carrier that is supposed to apply the TA command, or other mechanisms may be used such as to split the transmission positions for TA MAC CE between the SUL carrier and the NR UL carrier. For example, the first transmitted TA MAC CE is used for the SUL carrier, while the second transmitted TA MAC CE is used for the NR UL carrier.

Figure 7:
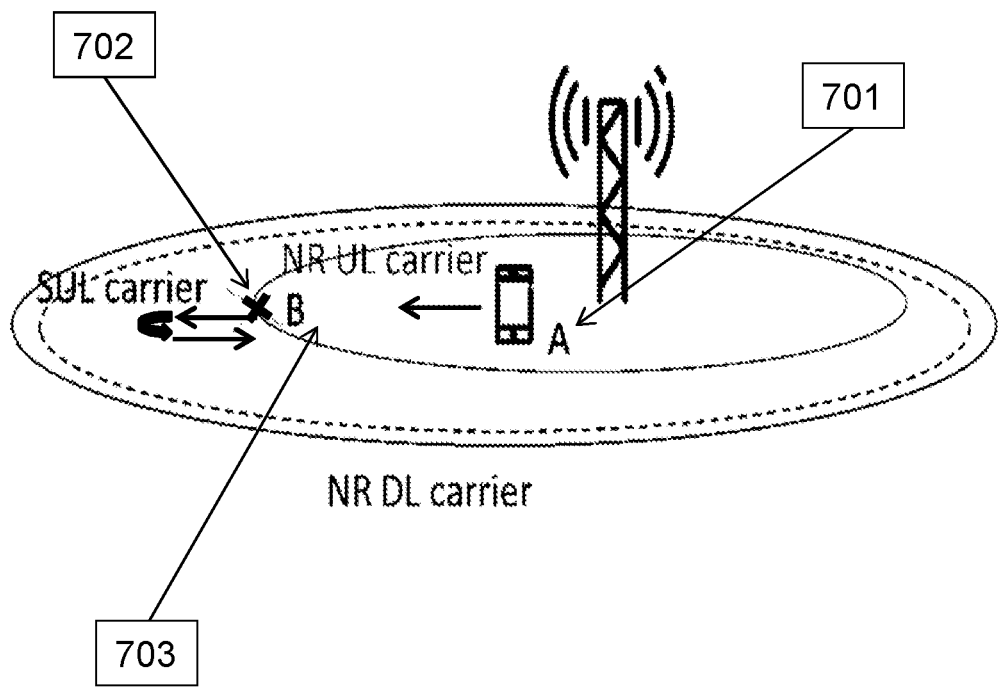
FIG. 7 is a schematic block diagram illustrating embodiments herein.

An example scenario of a TA configuration switch at an UL carrier switch in one cell such as the cell 11 is shown in FIG. 7.

Action 701. At location A, the UE powers on. The UE 120 sets up a service in the serving area, i.e. in the coverage of the NR UL carrier. The UE 120 may then start its TA timer for the NR UL carrier after performing a RACH access.

Action 702. Later on, when the UE 120 moves to location B and moves out of coverage of NR UL carrier, the UE 120 starts or restarts another TA timer for the SUL carrier according to the TA configuration for SUL carrier after switching to SUL carrier. At the same time the UE 120 may stop the first timer.

Action 703. Further, when the UE 120 moves back to the coverage of NR UL carrier service area and the UE 120 switches to the NR UL carrier, the UE 120 starts or restarts a new TA timer such as the TA timer according to the TA configuration for NR UL carrier while keeping the TA timer and/or configuration of the SUL carrier running, such as alive if configured. It may also be predefined that the TA configuration of the SUL carrier is always active for the UE 120.

Third Embodiments

In the third embodiments, the SUL carrier and NR UL carrier are configured to different TAGs. In this way, a single cell comprises at least two TAGs. Each TAG corresponds to one carrier, i.e. the NR UL carrier belongs to one TAG, while the SUL carrier belongs to another TAG. For each TAG, there may be a specific TA configuration, which e.g. is associated with a different timer setting, and a different TA granularity. The UE 120 may keep both TAGs active or just one TAG active at a time e.g. depending on which carrier is used to transmit PUSCH data. The following rules may be defined to determine the primary TAG also referred to as the first TAG and secondary TAG also referred to as the second TAG:

When both TA configurations are active, the TAG comprising the SUL carrier is defined as pTAG;
When only TA configuration of SUL carrier is active, the TAG comprising SUL carrier is defined as pTAG;
When only TA configuration of NR UL carrier is active, the TAG comprising NR UL carrier is defined as pTAG.

Fourth Embodiments

In the fourth embodiments, there may be other scenarios where the cell 11 comprises more than two UL carriers, e.g., at least one of the UL carriers is a SUL carrier. In that case, the similar mechanisms are applicable. In one case, all those UL carriers belong to the same TAG, and each carrier is associated with a separate TA configuration. In another case, all those UL carriers divided into more than one TAGs. Then each TAG is associated with a different TA configuration.

Fifth Embodiments

In the fifth embodiments, a single serving cell comprises multiple beams, or multiple TRPs, or multiple BWPs. The UE 120 such as e.g. its UE MAC is configured with multiple TA configurations. Each TA configuration is associated with a separate beam or TRP or BWP. Each TA configuration is associated with a different timer setting, and/or a different TA granularity.

Figure 8:
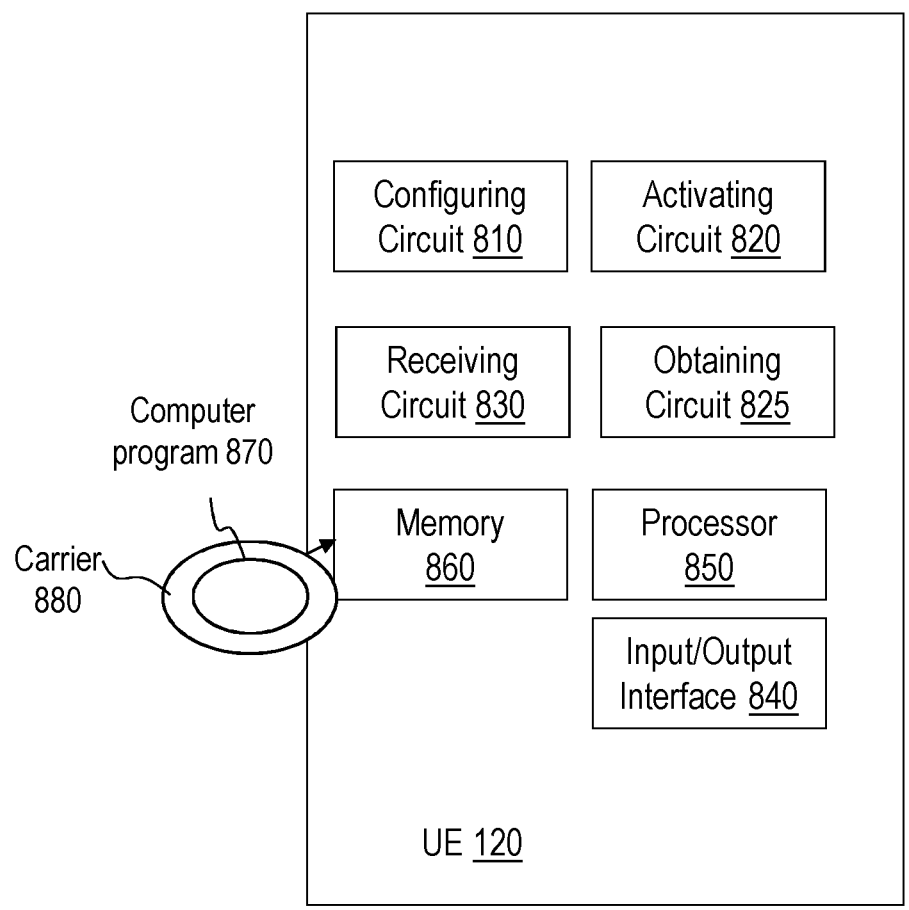
FIG. 8 is a schematic block diagram illustrating embodiments of a UE.

To perform the method actions e.g. for managing TA for UL transmissions between the UE 120 and the network node 110 in the wireless communications network 100, the UE 120 may comprise the arrangement depicted in FIG. 8. As mentioned above, the network node 110 serves a cell 11 adapted to comprise at least a first UL carrier 111 and a second UL carrier 112. The UE 120 may e.g. comprise an configuring circuit 810, an activating circuit 820, an obtaining circuit 825, and a receiving circuit 830. Those skilled in the art will also appreciate that the circuits in the UE 120 mentioned above may refer to a combination of analog and digital circuits, and/or one or more processors configured with software and/or firmware, e.g. stored in the UE 120 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The UE 120 may comprise an input and output interface 840 configured to communicate e.g. with the network node 110. The input and output interface 840 may comprise a wireless receiver (not shown) and a wireless transmitter not (shown).

The UE 120 is adapted to, e.g. by means of the configuring circuit 810 adapted to, configure the UE 120 with a first TA configuration for the first UL carrier 111 in the cell 11, and to configure the UE 120 with a second TA configuration for the second UL carrier in the cell 11.

UE 120 is adapted to, e.g. by means of the activating circuit 820 configured to activate at least one of the first and second TA configuration for the UE 120.

In some embodiments, the wireless communications network 100 is adapted to be a NR communications system wherein the second UL carrier 112 is adapted to be a SUL carrier.

In some embodiments, such as e.g. the first and second embodiments, the cell 11 is configured with a single TAG wherein the at least first UL carrier 111 and second UL carrier 112 all are adapted to belong to the same said single TAG but with different TA configurations including at least the first TA configuration and the second TA configuration.

In some embodiments, such as e.g. the first embodiments, only one TA configuration out of the first TA configuration and the second TA configuration is adapted to be active at a time.

The UE 120 may further be configured to, e.g. by means of the obtaining circuit 825 configured to, any one or more out of: When only the first TA configuration is active, obtain a first decision to switch active TA configuration such that only the second TA configuration is active, when only the second TA configuration is active, obtain a second decision to switch active TA configuration such that only the first TA configuration is active, and wherein the UE 120 further may be configured to, e.g. by means of the activating circuit 820 further configured to, activate at least one of the first and second TA configuration for the UE 120 according to any one out of: the obtained first decision to switch active TA configuration and the obtained second decision to switch active TA configuration.

In some embodiments, such as e.g. the second and third embodiments, at least both the first TA configuration and the second TA configuration are adapted to be active simultaneously.

In some embodiments, such as e.g. the second and third embodiments, the first UL carrier 111 is adapted to be configured with a first TAT, and the second UL carrier 112 is adapted to be configured with a second TAT, which first TAT and second TAT are adapted to run simultaneously.

In some embodiments, such as e.g. the third embodiments, the cell 11 is adapted to be configured with at least two TAGs, wherein the at least first UL carrier 111 and second UL carrier 112 all are adapted to belong different TAGs with different TA configurations including at least the first TA configuration and the second TA configuration.

Each of the first TA configuration and second TA configuration may be adapted to be a configuration for any one or more out of: TAT, timing advance granularity, and a range of timing advance.

The UE 120 may further be configured to, e.g. by means of a receiving circuit 830 configured to receive the first TA configuration data and the second TA configuration data from the network node 110, wherein the configuring circuit 810 further may be adapted to configure the UE 120 with the first TA configuration based on the first TA configuration data, and configure the UE 120 with a second TA configuration based on the second TA configuration data.

The embodiments herein may be implemented through a respective processor or one or more processors, such as a processor 850 of a processing circuitry in the UE 120 depicted in FIG. 8, together with respective computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise a memory 860 comprising one or more memory units. The memory comprises instructions executable by the processor in.

The memory 860 is arranged to be used to store e.g. data, configurations, TA configuration data, TA configurations and applications to perform the methods herein when being executed in the UE 120.

In some embodiments, a respective computer program 870 comprises instructions, which when executed by the respective at least one processor 850, cause the at least one processor 850 of the UE 120 to perform the actions above.

In some embodiments, a respective carrier 880 comprises the respective computer program 870, wherein the carrier is one of an electronic signal, an optical signal, an electromagnetic signal, a magnetic signal, an electric signal, a radio signal, a microwave signal, or a computer-readable storage medium.

Figure 9:
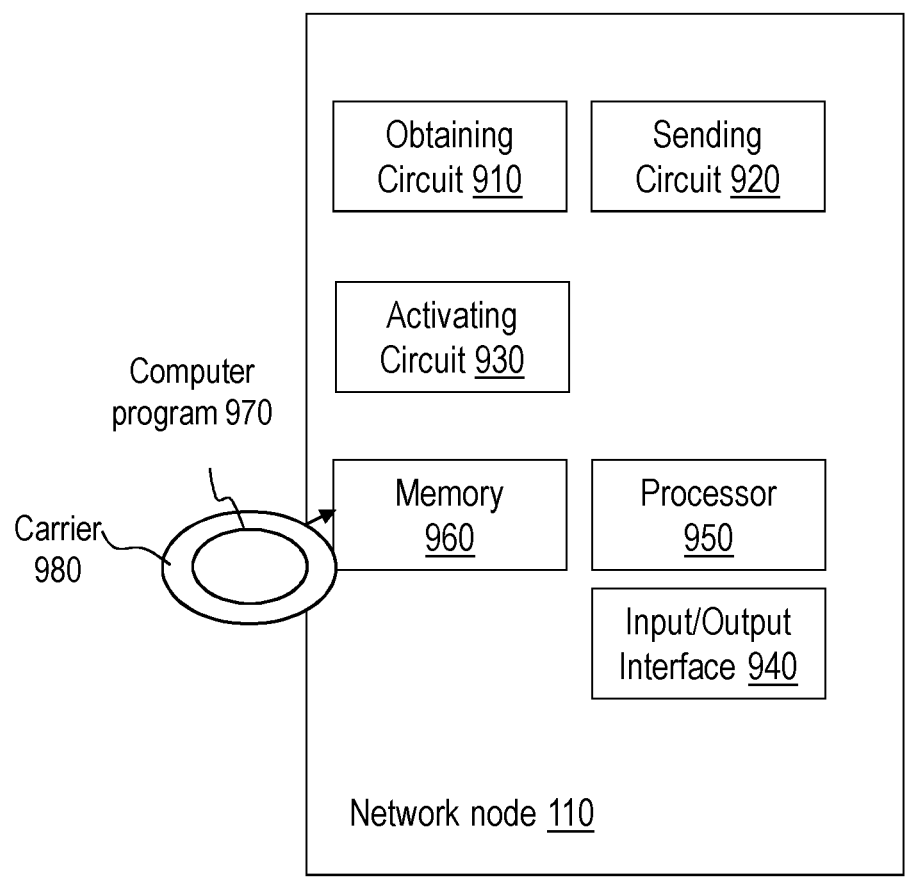
FIG. 9 is a schematic block diagram illustrating embodiments of a network node.

To perform the method actions e.g. for managing TA for UL transmissions between the UE 120 and the network node 110 in the wireless communications network 100, the network node 110 may comprise the arrangement depicted in FIG. 9. As mentioned above, the network node 110 serves a cell 11 adapted to comprise at least a first UL carrier 111 and a second UL carrier 112. The network node 110 may e.g. comprise an obtaining circuit 910, a sending circuit 920, and an activating circuit 930. Those skilled in the art will also appreciate that the circuits in the network node 110 mentioned above may refer to a combination of analog and digital circuits, and/or one or more processors configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The network node 110 may comprise an input and output interface 940 configured to communicate e.g. with the UE 120. The input and output interface 940 may comprise a wireless receiver (not shown) and a wireless transmitter not (shown).

The network node 110 is adapted to, e.g. by means of the obtaining circuit 910 adapted to, obtain a first TA configuration data for the first UL carrier 111 in the cell 11, and a second TA configuration data for the second UL carrier in the cell 11.

The network node 110 is further adapted to, e.g. by means of the sending circuit 920 adapted to, send the first TA configuration data and the second TA configuration data to the UE 120.

The network node 110 is further adapted to, e.g. by means of the obtaining circuit 910 adapted to, activate at least one of the first TA configuration based on the first TA configuration data, and the second TA configuration based on the second TA configuration data for the UE 120.

In some embodiments, the wireless communications network 100 is adapted to be a New Radio, NR, communications system. In these embodiments, the second UL carrier 112 is adapted to be a SUL carrier.

In some embodiments, such as e.g. the first and second embodiments, the cell 11 is configured with a single TAG wherein the at least first UL carrier 111 and second UL carrier 112 all are adapted to belong to the same said single TAG but with different TA configurations including at least the first TA configuration and the second TA configuration.

In some embodiments, such as e.g. the first embodiments, only one TA configuration out of the first TA configuration and the second TA configuration is adapted to be active at a time. In these embodiments, the network node 110 is further configured to, e.g. by means of the obtaining circuit 910 further configured to any one or more out of: When only the first TA configuration is active, the network node 110 may obtain a first decision to switch active TA configuration such that only the second TA configuration is active, when only the second TA configuration is active, the network node 110 may obtain a second decision to switch active TA configuration such that only the first TA configuration is active, and wherein the network node 110 further may be configured to, e.g. by means of the activating circuit 930 further being configured to, activate at least one of the first and second TA configuration for the UE 120 according to any one out of: The obtained first decision to switch active TA configuration and the obtained second decision to switch active TA configuration.

In some embodiments, such as e.g. the second and third embodiments, at least both the first TA configuration and the second TA configuration are adapted to be active simultaneously. In these embodiments, the first UL carrier 111 may be adapted to be configured with a first TAT, and the second UL carrier 112 may be adapted to be configured with a second TAT, which first TAT and second TAT are adapted to run simultaneously.

In some embodiments, such as e.g. the third embodiments, the cell 11 is adapted to be configured with a at least two Timing Advanced Groups, TAGs, and wherein the at least first UL carrier 111 and second UL carrier 112 all are adapted to belong different TAGs with different TA configurations including at least the first TA configuration and the second TA configuration.

Each of the first TA configuration data and the second TA configuration data may be adapted to be configuration data for any one or more out of: Time Alignment Timer, TAT, timing advance granularity, and a range of timing advance.

The embodiments herein may be implemented through a respective processor or one or more processors, such as the processor 950 of a processing circuitry in the network node 110 depicted in FIG. 9, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 960 comprising one or more memory units. The memory 960 comprises instructions executable by the processor in network node 110. The memory 960 is arranged to be used to store e.g. data, configurations, TA configuration data, TA configurations and applications to perform the methods herein when being executed in the network node 110.

In some embodiments, a respective computer program 970 comprises instructions, which when executed by the respective at least one processor 960, cause the at least one processor 960 of the network node 110 to perform the actions above.

In some embodiments, a respective carrier 980 comprises the respective computer program 970, wherein the carrier 980 is one of an electronic signal, an optical signal, an electromagnetic signal, a magnetic signal, an electric signal, a radio signal, a microwave signal, or a computer-readable storage medium.

Further Extensions and Variations

Figure 10:
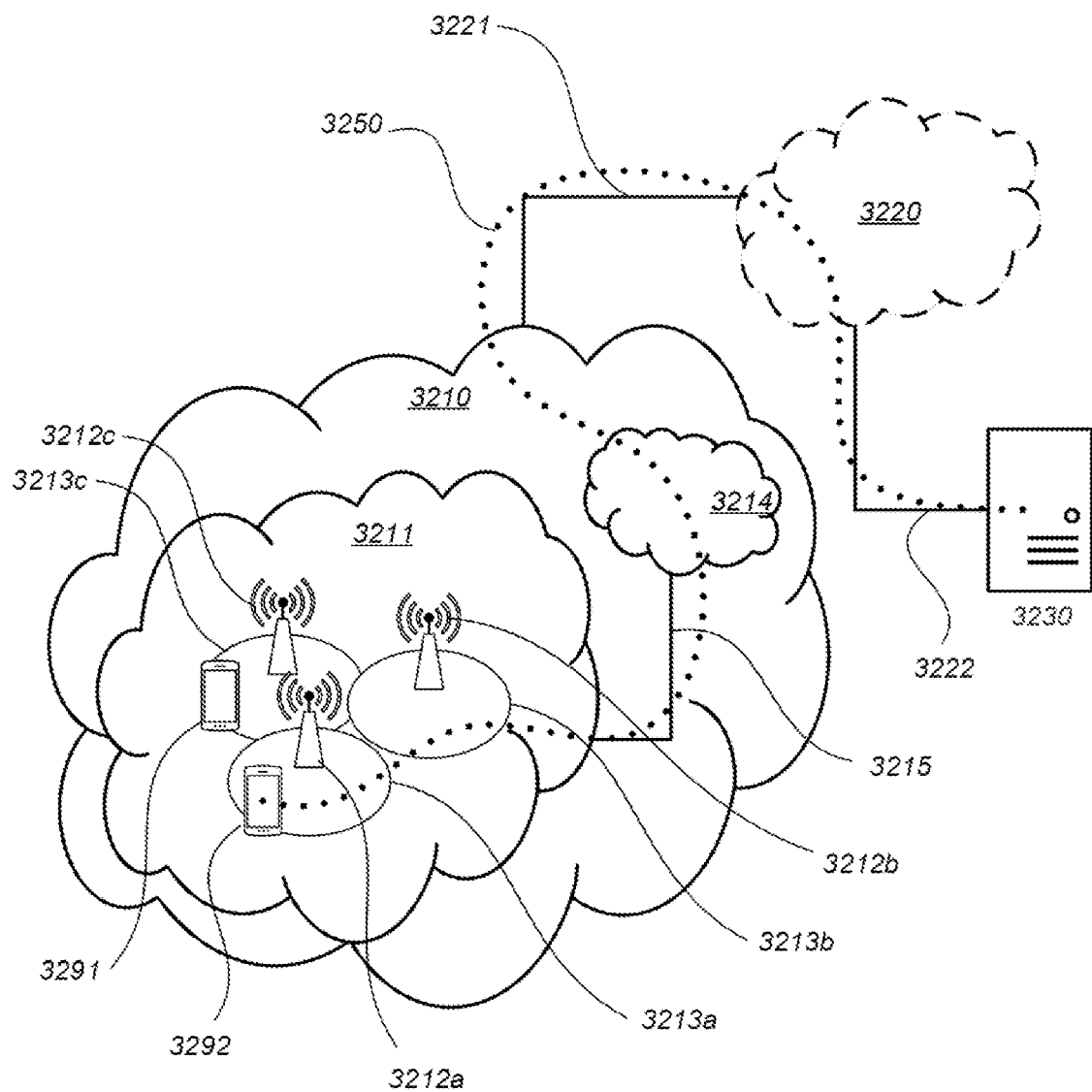
FIG. 10 schematically illustrates a telecommunication network connected via an intermediate network to a host computer.

With reference to FIG. 10, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 11 may be identical to the host computer 3230, one of the base stations 3212*a*, 3212*b*, 3212*c* and one of the UEs 3291, 3292 of FIG. 10, respectively. This is to say, the inner workings of these entities may be as shown in FIG. 11 and independently, the surrounding network topology may be that of FIG. 10.

Figure 11:
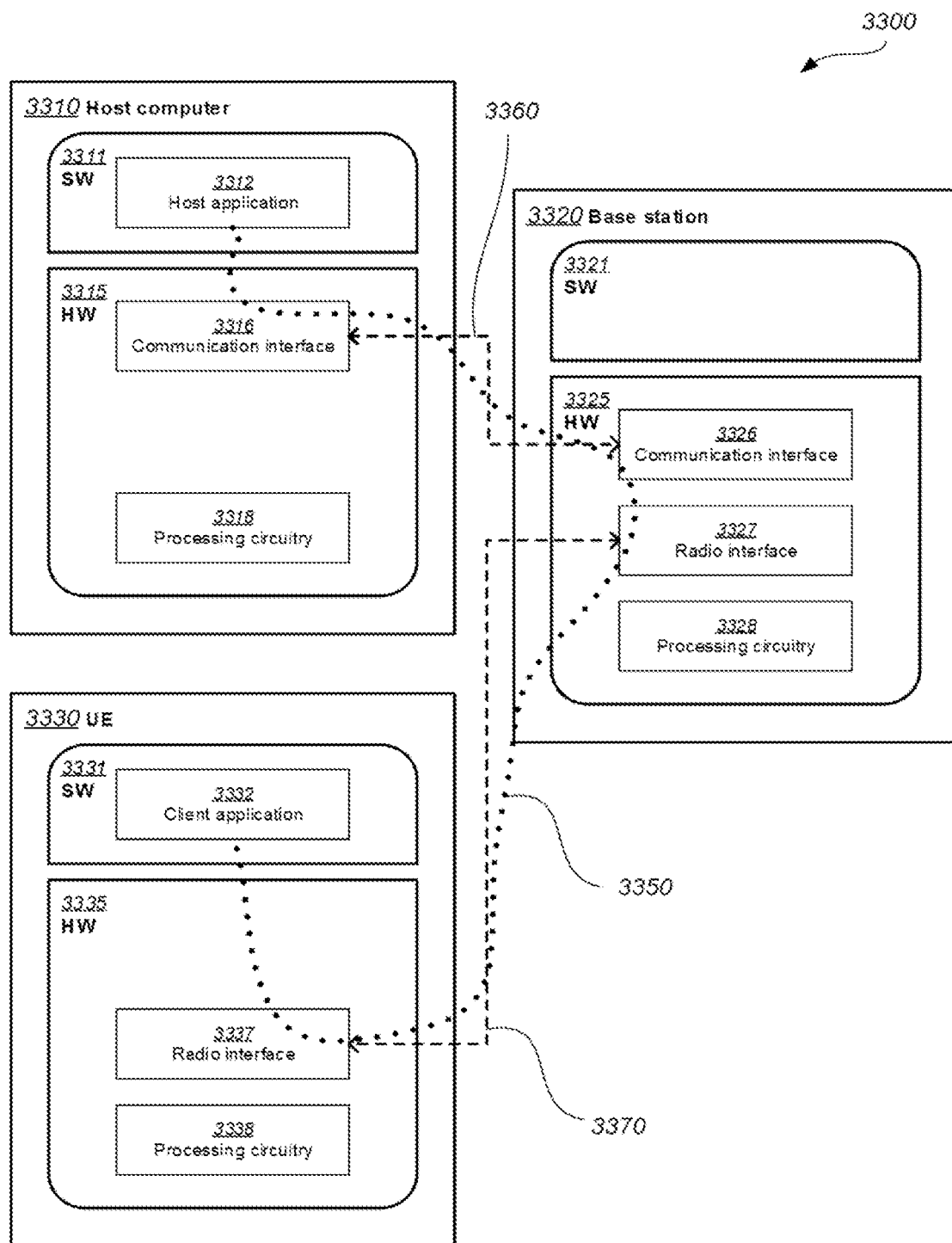
FIG. 11 is a generalized block diagram of a host computer communicating via a base station with a user equipment over a partially wireless connection.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 12, 13:
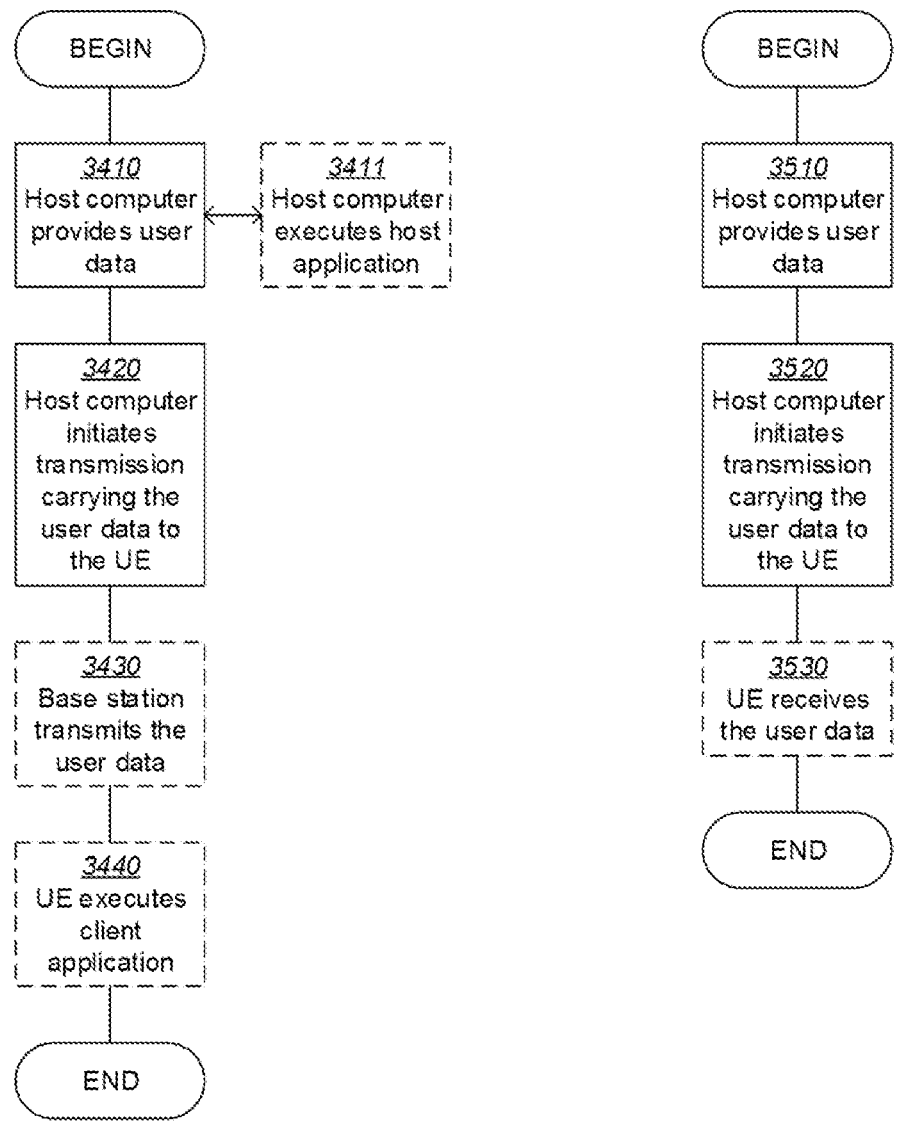
FIGS. 12 to 15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 10 and 11. For simplicity of the present disclosure, only drawing references to FIG. 12 will be included in this section. In a first action 3410 of the method, the host computer provides user data. In an optional sub action 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 10 and 11. For simplicity of the present disclosure, only drawing references to FIG. 21 will be included in this section. In a first action 3510 of the method, the host computer provides user data. In an optional sub action (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 14:
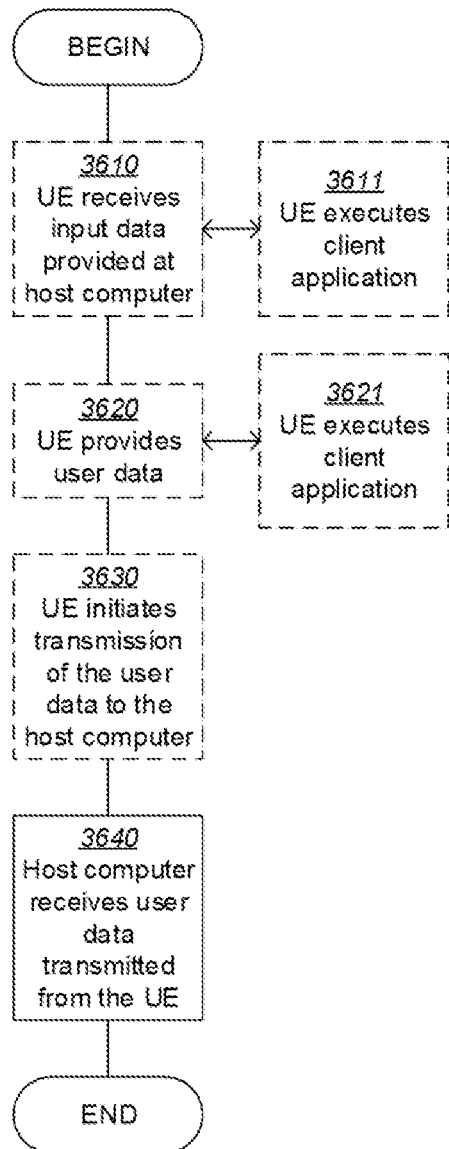

FIG. 14 is a flowchart illustrating a method implemented in a communication system, in accordance with one embodiment. The communication system includes a host computer, a base station such as a AP STA, and a UE such as a Non-AP STA which may be those described with reference to FIGS. 10 and 11. For simplicity of the present disclosure, only drawing references to FIG. 14 will be included in this section. In an optional first action 3610 of the method, the UE receives input data provided by the host computer. Additionally or alternatively, in an optional second action 3620, the UE provides user data. In an optional sub action 3621 of the second action 3620, the UE provides the user data by executing a client application. In a further optional sub action 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub action 3630, transmission of the user data to the host computer. In a fourth action 3640 of the method, the host computer receives the user data transmitted from the UE, in accordance with the teachings of the embodiments described throughout this disclosure.

Figure 15:
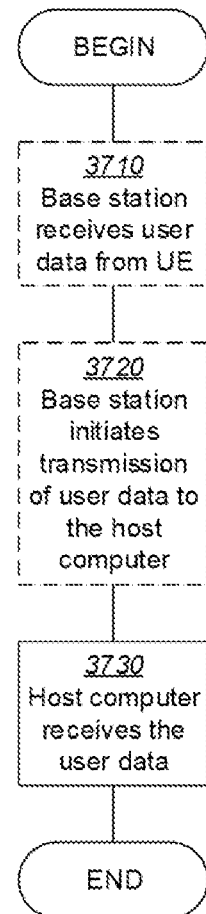

FIG. 15 is a flowchart illustrating a method implemented in a communication system, in accordance with one embodiment. The communication system includes a host computer, a base station such as a AP STA, and a UE such as a Non-AP STA which may be those described with reference to FIGS. 10 and 11. For simplicity of the present disclosure, only drawing references to FIG. 15 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a User Equipment (UE) for managing Time Alignment (TA) for Uplink (UL) transmissions between the UE and a network node in a wireless communications network, the network node serves a cell comprising at least a first UL carrier and a second UL carrier, the method comprising:
configuring the UE with a first TA configuration for the first UL carrier in the cell, and configuring the UE with a second TA configuration for the second UL carrier in the cell;
activating at least one of the first and second TA configuration for the UE, each of the first TA configuration and second TA configuration being a configuration for a timing advance granularity, and each of the first TA configuration and second TA configuration being associated with at least one of a separate beam and a Transmission/Reception Point (TRP); and
only one TA configuration out of the first TA configuration and the second TA configuration is active at a time, and the method further comprises any one or more of:
when only the first TA configuration is active, obtaining a first decision to switch active TA configuration such that only the second TA configuration is active;
when only the second TA configuration is active, obtaining a second decision to switch active TA configuration such that only the first TA configuration is active; and
activating at least one of the first and second TA configuration for the UE according to any one out of: the obtained first decision to switch active TA configuration and the obtained second decision to switch active TA configuration.

2. The method of claim 1, wherein the wireless communications network is a New Radio (NR) communications system and wherein the second UL carrier is a Supplementary UL (SUL) carrier.

3. The method of claim 1, wherein any one out of: only one TA configuration out of the first TA configuration and the second TA configuration is active at a time, or at least both the first TA configuration and the second TA configuration are active simultaneously.

4. The method of claim 3, wherein at least both the first TA configuration and the second TA configuration are active simultaneously, and wherein the first UL carrier is configured with a first Time Alignment Timer (TAT) and the second UL carrier is configured with a second TAT, which first TAT and second TAT run simultaneously.

5. The method of claim 1, further comprising:
receiving first TA configuration data and second TA configuration data from the network node, and
wherein configuring the UE with the first TA configuration is performed based on the first TA configuration data, and wherein configuring the UE with the second TA configuration is performed based on the second TA configuration data.

6. A method performed by a network node for managing Time Alignment (TA) for Uplink (UL) transmissions between a User Equipment (UE) and the network node in a wireless communications network, the network node serves a cell comprising at least a first UL carrier and a second UL carrier, the method comprising:
obtaining a first TA configuration data for the first UL carrier in the cell;
obtaining a second TA configuration data for the second UL carrier in the cell;
sending the first TA configuration data and the second TA configuration data to the UE;
activating at least one of a first TA configuration based on the first TA configuration data and a second TA configuration based on the second TA configuration data for the UE, each of the first TA configuration data and second TA configuration data comprising configuration data for a timing advance granularity, and each of the first TA configuration and second TA configuration being associated with at least one of a separate beam and a Transmission/Reception Point (TRP); and
only one TA configuration out of the first TA configuration and the second TA configuration is active at a time, and the method further comprises any one or more of:
when only the first TA configuration is active, obtaining a first decision to switch active TA configuration such that only the second TA configuration is active,
when only the second TA configuration is active, obtaining a second decision to switch active TA configuration such that only the first TA configuration is active, and
activating at least one of the first and second TA configuration for the UE according to any one out of: the obtained first decision to switch active TA configuration and the obtained second decision to switch active TA configuration.

7. The method of claim 6, wherein the wireless communications network is a New Radio (NR) communications system and wherein the second UL carrier is a Supplementary UL (SUL) carrier.

8. The method of claim 6, wherein any one or more out of:
only one TA configuration out of the first TA configuration and the second TA configuration is active at a time, or
at least both the first TA configuration and the second TA configuration are active simultaneously.

9. The method of claim 8, wherein at least both the first TA configuration and the second TA configuration are active simultaneously, and wherein the first UL carrier is configured with a first Time Alignment Timer (TAT) and the second UL carrier is configured with a second TAT, which first TAT and second TAT run simultaneously.

10. A User Equipment (UE) for managing Time Alignment (TA) for Uplink (UL) Transmissions, between the UE and a network node in a wireless communications network, the network node serves a cell comprising at least a first UL carrier and a second UL carrier, the UE comprising:
a processing circuit; and
memory storing software or firmware or both, for execution by the processing circuit, whereby the UE is configured to:
configure the UE with a first TA configuration for the first UL carrier in the cell;
configure the UE with a second TA configuration for the second UL carrier in the cell;
activate at least one of the first and second TA configuration for the UE, each of the first TA configuration and second TA configuration being a configuration for a timing advance granularity, and each of the first TA configuration and second TA configuration being associated with at least one of a separate beam and a Transmission/Reception Point (TRP); and
only one TA configuration out of the first TA configuration and the second TA configuration is configured to be active at a time and the UE is further configured to any one or more of:
when only the first TA configuration is active, obtain a first decision to switch active TA configuration such that only the second TA configuration is active;
when only the second TA configuration is active, obtain a second decision to switch active TA configuration such that only the first TA configuration is active, and
the UE further is configured to activate at least one of the first and second TA configuration for the UE according to any one out of: the obtained first decision to switch active TA configuration and the obtained second decision to switch active TA configuration.

11. The UE of claim 10, wherein at least both the first TA configuration and the second TA configuration are configured to be active simultaneously, and wherein the first UL carrier is configured with a first Time Alignment Timer (TAT) and the second UL carrier is configured with a second TAT, which first TAT and second TAT are configured to run simultaneously.

12. The UE of claim 10, being further configured to:
receive first TA configuration data and second TA configuration data from the network node; and
configure the UE with the first TA configuration based on the first TA configuration data, and configure the UE with the second TA configuration based on the second TA configuration data.

13. A network node for managing Time Alignment (TA) for Uplink (UL) Transmissions, between a User Equipment (UE) and the network node in a wireless communications network, the network node serves a cell adapted to comprise at least a first UL carrier and a second UL carrier, the network node comprising:
a processing circuit; and
memory storing software or firmware or both, for execution by the processing circuit, whereby the network node is configured to:
obtain a first TA configuration data for the first UL carrier in the cell, and a second TA configuration data for the second UL carrier in the cell, send the first TA configuration data and the second TA configuration data to the UE;
activate at least one of the first TA configuration based on the first TA configuration data and second TA configuration based on the second TA configuration data for the UE, each of the first TA configuration data and second TA configuration data comprising configuration data for a timing advance granularity, and each of the first TA configuration and second TA configuration being associated with at least one of a separate beam, and a Transmission/Reception Point (TRP); and
only one TA configuration out of the first TA configuration and the second TA configuration is configured to be active at a time, and wherein the UE is further configured to any one or more of:
when only the first TA configuration is active, obtain a first decision to switch active TA configuration such that only the second TA configuration is active;
when only the second TA configuration is active, obtain a second decision to switch active TA configuration such that only the first TA configuration is active; and
the network node further is configured to activate at least one of the first and second TA configuration for the UE according to any one out of: the obtained first decision to switch active TA configuration and the obtained second decision to switch active TA configuration.

14. The network node of claim 13, wherein at least both the first TA configuration and the second TA configuration are adapted to be active simultaneously, and wherein the first UL carrier is configured with a first Time Alignment Timer (TAT) and the second UL carrier is configured with a second TAT, which first TAT and second TAT are configured to run simultaneously.

* * * * *